United States Patent
Tran et al.

(10) Patent No.: US 9,572,747 B2
(45) Date of Patent: Feb. 21, 2017

(54) INDUCTIVE COUPLING

(71) Applicants: Minh Sang Tran, Ontario (CA); Chris Alexander, Ontario (CA)

(72) Inventors: Minh Sang Tran, Ontario (CA); Chris Alexander, Ontario (CA)

(73) Assignee: Gulfstream Inc., Ontario (CA)

( * ) Notice: Subject to any disclaimer, the term of this patent is extended or adjusted under 35 U.S.C. 154(b) by 93 days.

(21) Appl. No.: 14/513,053

(22) Filed: Oct. 13, 2014

(65) Prior Publication Data

US 2015/0101117 A1    Apr. 16, 2015

Related U.S. Application Data

(60) Provisional application No. 61/889,771, filed on Oct. 11, 2013.

(51) Int. Cl.
| | |
|---|---|
| *A61H 33/00* | (2006.01) |
| *H02K 7/11* | (2006.01) |
| *H02K 7/14* | (2006.01) |
| *F16D 27/01* | (2006.01) |

(52) U.S. Cl.
CPC .......... *A61H 33/0087* (2013.01); *H02K 7/11* (2013.01); *H02K 7/14* (2013.01); *A61H 2201/1215* (2013.01); *F16D 27/01* (2013.01)

(58) Field of Classification Search
CPC .................................. A61H 33/02; A47H 3/10
USPC ................................................. 4/541.1–541.6
See application file for complete search history.

(56) References Cited

U.S. PATENT DOCUMENTS

| | | | | |
|---|---|---|---|---|
| 3,481,586 | A * | 12/1969 | Roberts | F04D 13/026 366/264 |
| 4,982,461 | A * | 1/1991 | Mikiya | A61H 33/6063 4/541.3 |
| 7,249,571 | B2 * | 7/2007 | Allis | A01K 63/042 119/261 |
| 7,393,188 | B2 * | 7/2008 | Lawyer | F04D 29/628 4/541.1 |
| 8,944,786 | B1 * | 2/2015 | McDougall | 4/541.3 |

* cited by examiner

*Primary Examiner* — Huyen Le
(74) *Attorney, Agent, or Firm* — Avery N Goldstein; Blue Filament Law PLLC

(57) ABSTRACT

The coupling includes drive and driven hubs. The drive hub is mounted to a rotating element and has a surface presenting away therefrom. In the absence of externalities, a magnetic field is produced wherein, if depicted graphically, concentrations of field lines extend from two or more North pole domains defined in the surface to two or more South pole domains defined in the surface, the domains being spaced apart and encircling the rotation axis in alternating relation. The driven hub is disposed in spaced, frontwardly adjacent relation to the drive hub, is fixed to the rotatable element and is at least substantially constrained against movement but for rotation with the rotatable element. The driven hub includes: a rotor body of a non-magnetic, electrically-conductive material having relatively low magnetic permeability; and a flux ring of material having a relatively high magnetically permeability arranged in spaced relation to the body.

19 Claims, 13 Drawing Sheets

INDUCTIVE COUPLING

RELATED APPLICATIONS

This application in a non-provisional application that claims priority benefit to U.S. Provisional application Ser. No. 61/889,771 filed Oct. 11, 2013; the contents of which are hereby incorporated by reference.

FIELD OF THE INVENTION

The present invention relates to the field of couplings.

BACKGROUND OF THE INVENTION

It is known to provide for a magnetic coupling between an impeller and a motor in the context of foot spa units. In known couplings, high performance permanent magnets are used in pairs.

SUMMARY OF THE INVENTION

Forming one aspect of the invention is apparatus for coupling a rotating element to a rotatable element, the rotating element rotating around a rotation axis. This apparatus includes a drive hub and a driven hub. The drive hub: in use, is mounted to the rotating element for rotation therewith about the rotation axis; has a front surface which presents away from the rotating element in use; and has magnetic properties such that, in the absence of externalities, a magnetic field is produced which extends from and returns to the drive hub, the magnetic field being characterized in that, if depicted graphically, concentrations of field lines would appear to extend from two or more North pole domains defined in the front surface to two or more South pole domains defined in the front surface, the North and South pole domains being spaced apart from each other and arranged to encircle the rotation axis in alternating relation. The driven hub: in use, is disposed in spaced, frontwardly adjacent relation to the drive hub, is fixedly coupled to the rotatable element and is at least substantially constrained against movement but for rotation, with the rotatable element, about the rotation axis; and includes a rotor body of a non-magnetic, electrically-conductive material having relatively low magnetic permeability. A flux ring of material having a relatively high magnetically permeability is arranged in spaced relation to the rotor body. Rotation of the drive hub relative to the driven hub creates a net rotational force on the driven hub that urges the driven hub to rotate in the same direction as the drive hub.

According to another aspect of the invention, in use, magnetic field lines associated with the drive hub pass through the rotor body in a manner such that, in the aggregate, the through-passing field lines are dominated by field lines that extend through the rotor body in a direction that is substantially tangential to the direction of rotation.

According to another aspect of the invention, each of the North pole domains can be defined by a respective permanent magnet and each of the South pole domains can be defined by a respective permanent magnet.

According to another aspect of the invention, the number of North pole domains can equal the number of South pole domains.

According to another aspect of the invention, in use, the permanent magnets can be equally spaced about the rotation axis.

According to another aspect of the invention, the drive hub can have a backer plate defined by a material having relatively high magnetic permeability.

According to another aspect of the invention, the drive hub can have a backer plate defined by a ferromagnetic material.

According to another aspect of the invention, the drive hub can have a backer plate defined by an iron alloy.

According to another aspect of the invention, the rotor body can be made of a paramagnetic material.

According to another aspect of the invention, the rotor body can be made of an aluminum alloy.

According to another aspect of the invention, the flux ring can be made from a ferromagnetic material.

According to another aspect of the invention, the flux ring can be made of carbon steel.

According to another aspect of the invention, the permanent magnets can be disc-shaped.

The apparatus can be used as part of an improved spa, which forms another aspect of the invention. The spa includes; a basin for containing water; a motor mounted exteriorly of the basin and having a rotating shaft; and a centrifugal pump mounted interiorly of the basin and including an impeller which, in use, is rotated by the motor for circulating water contained in the basin. The improvement comprises the apparatus in use such that the rotating shaft defines the rotating element and the impeller defines the rotatable element.

Other advantages of the present invention will become evident upon review of the accompanying detailed description and drawings, the latter being briefly described hereinafter.

DETAILED DESCRIPTION OF THE INVENTION

An exemplary embodiment of the present invention is described in detail in the following paragraphs.

However, by way of background, reference is now made to FIGS. 1-4, which show a prior art spa product.

This product will be seen to include: a basin; a motor, encompassed by encircled area 11; and a centrifugal pump, encompassed by encircled area 2.

The basin is for containing water.

The motor is mounted exteriorly of the basin.

Figure 4:
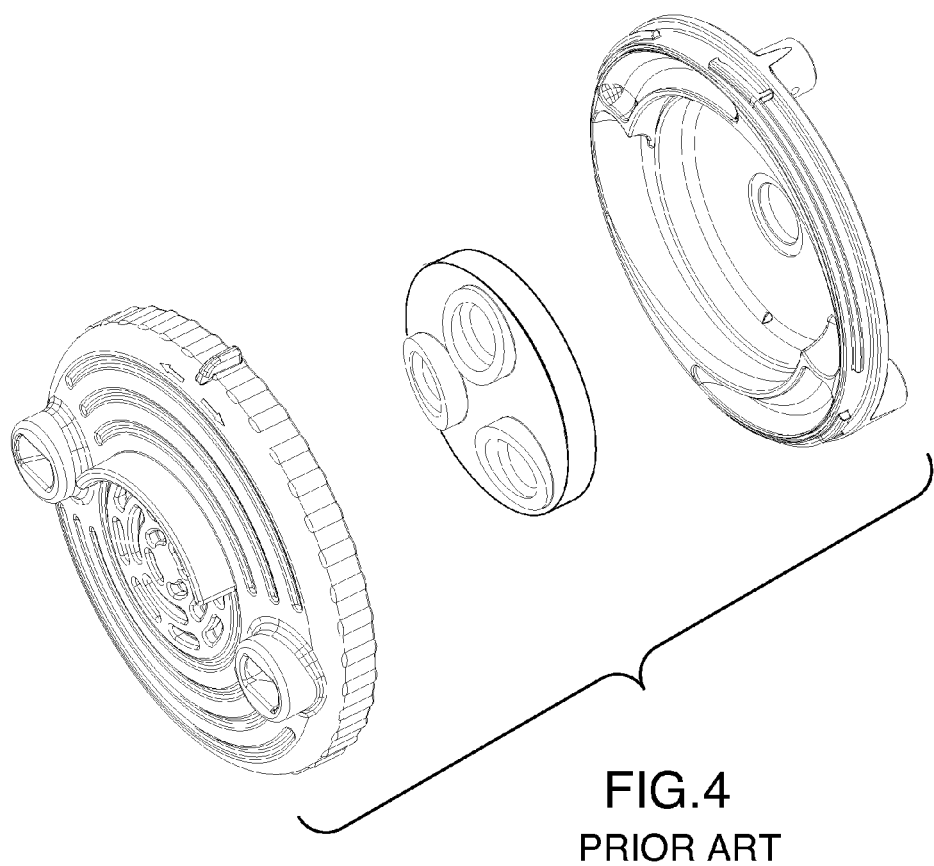
FIG. 4 is an exploded perspective view of encircled structure 2 of FIG. 1.
Figure 5A:
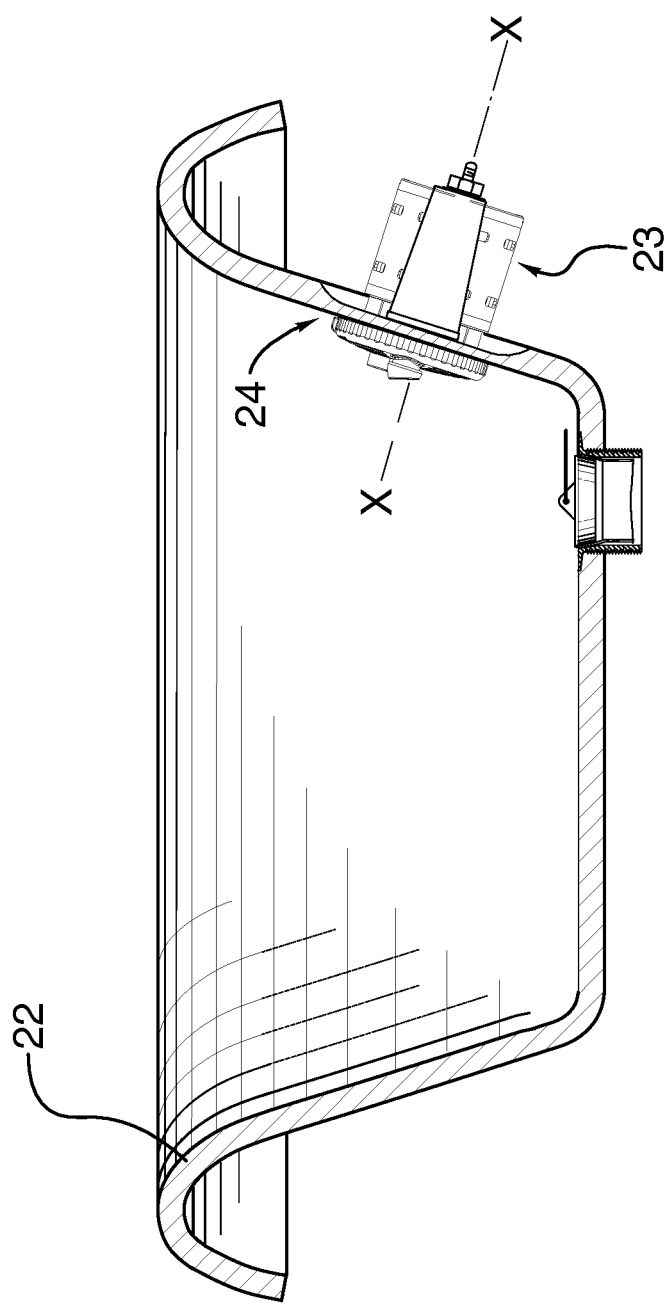
FIG. 5A is a view similar to FIG. 1 showing a foot spa according to an exemplary embodiment of the invention.
Figure 5B:
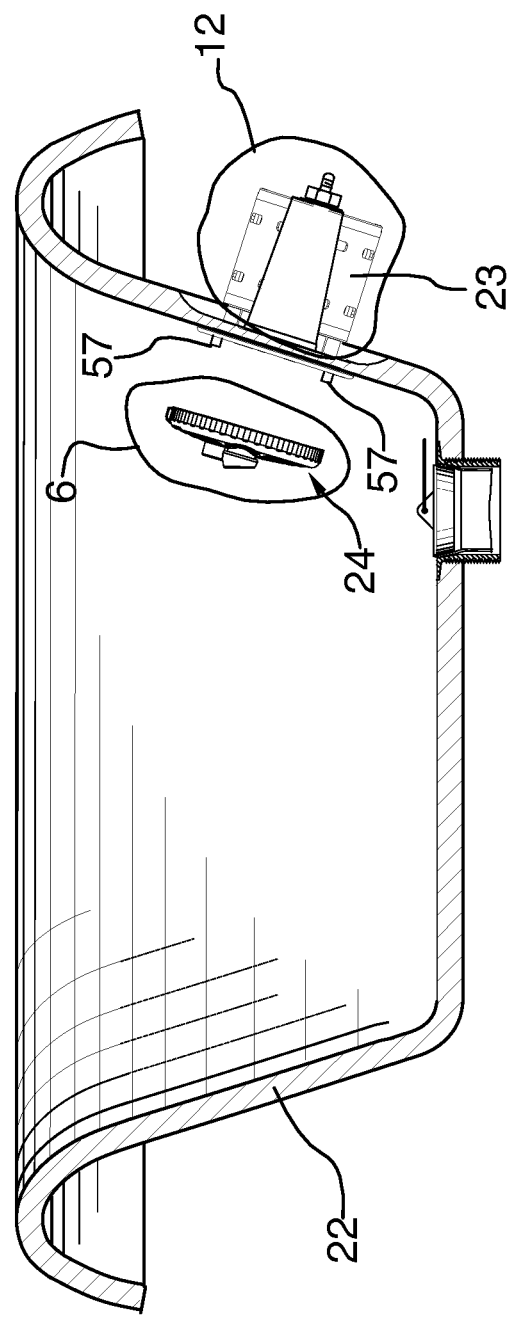
FIG. 5B is a partially exploded view of the structure of FIG. 5A.
Figure 6:
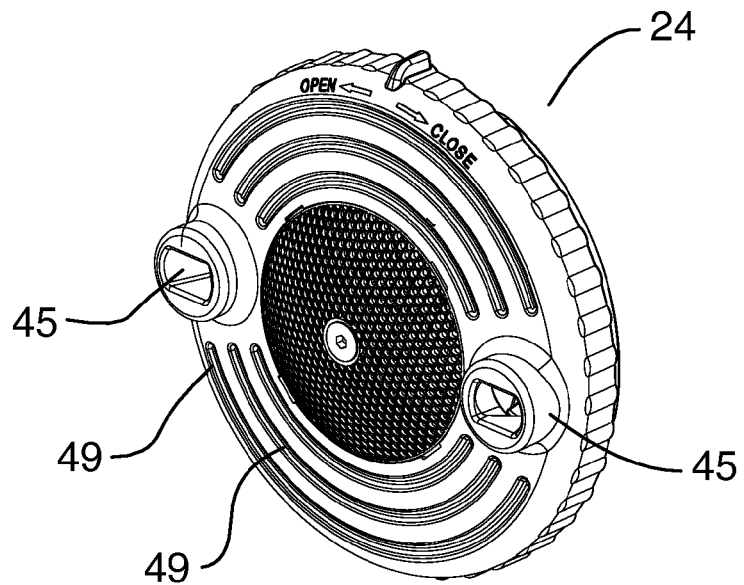
FIG. 6 is a perspective view of encircled structure 6 of FIG. 5B.
Figure 7:
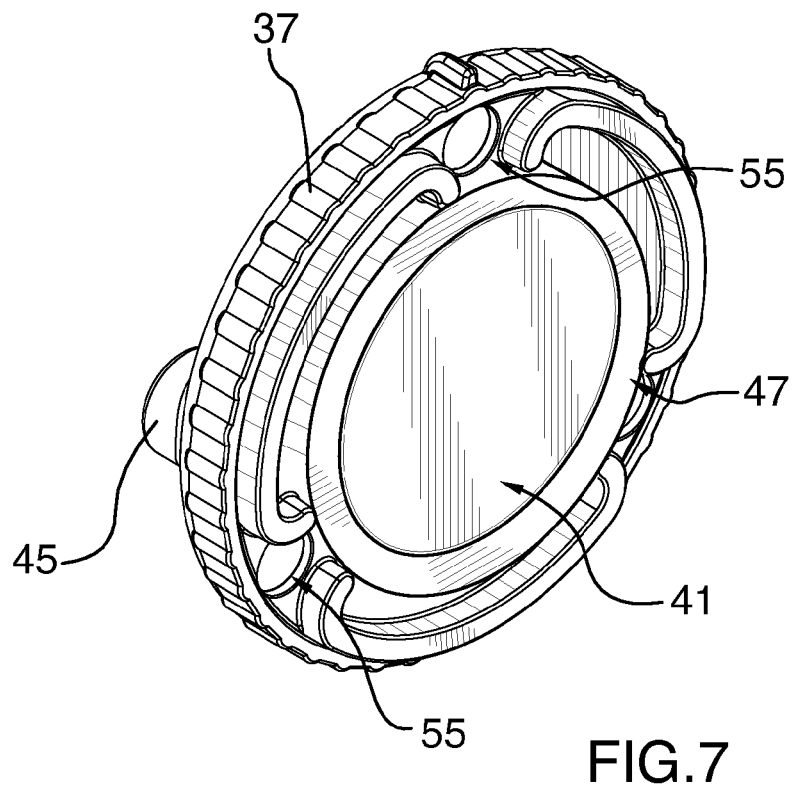
FIG. 7 is a perspective view of the structure of FIG. 6 from another vantage point.

The pump is positioned interiorly of the basin and has an impeller, as seen in exploded view FIG. 4.

The prior art spa will also be understood to include a coupling constructed in accordance with the teachings of U.S. Pat. No. 7,393,188 and US 2011/0176943, incorporated herein by reference. This prior art coupling, not shown, is defined by a series of permanent magnets fixed to the motor for rotation, and a further series of permanent magnets fixed to the impeller.

The attraction between these magnets serves to releasably mount the impeller, and the balance of the pump within it is housed, to the basin and also to rotatably couple the impeller to the drive shaft.

Figure 1:
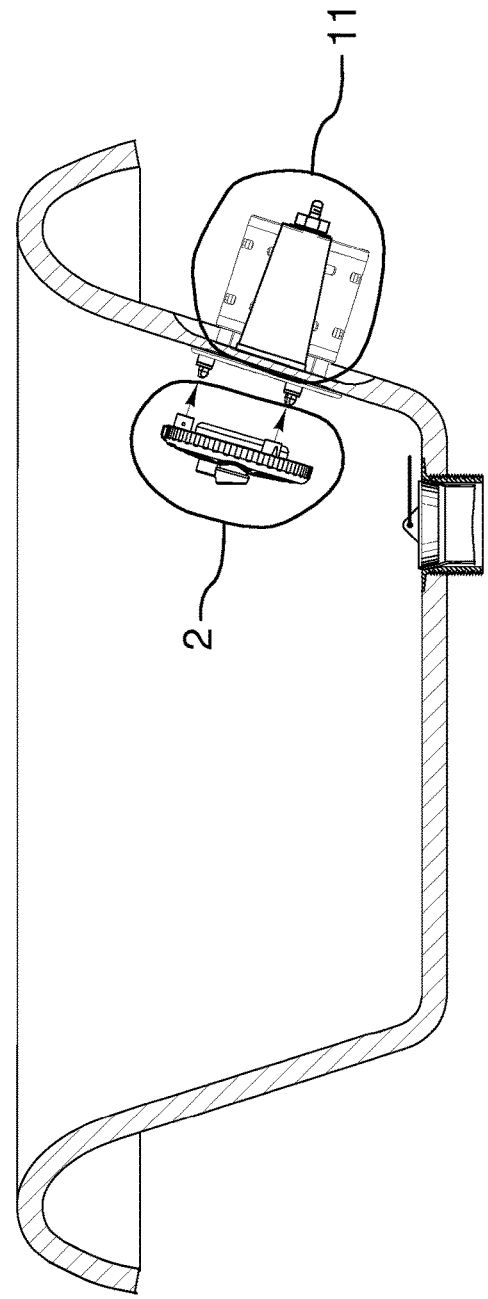
FIG. 1 is cross-sectional, partially exploded view of a foot spa according to the prior art.
Figure 2:
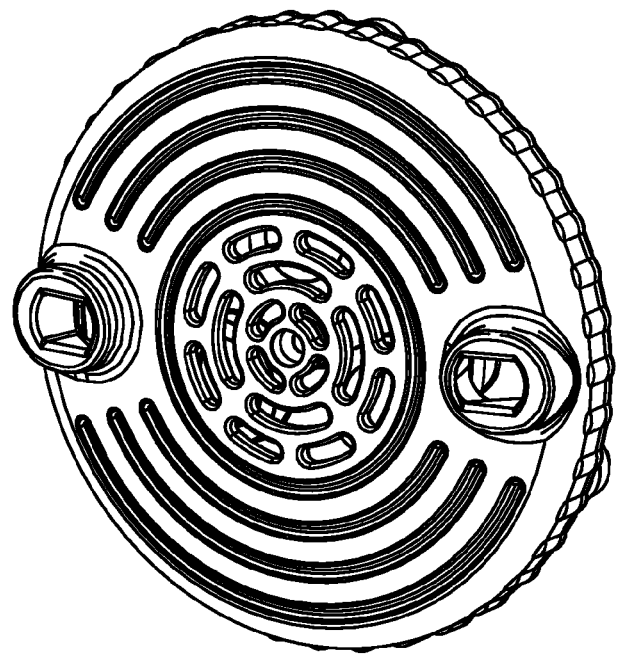
FIG. 2 is a front perspective view of encircled structure 2 of FIG. 1.
Figure 3:
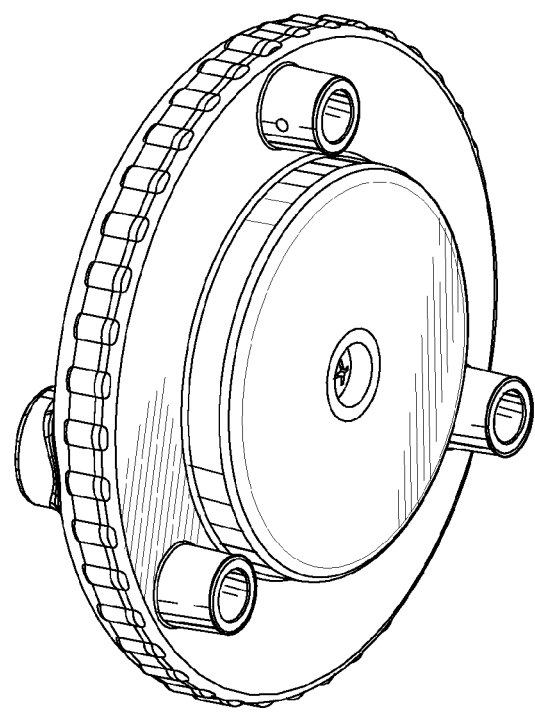
FIG. 3 is a rear perspective view of encircled structure 2 of FIG. 1.

Pin and socket connections are shown in FIG. 1, but it will be appreciated that these connections serve only to hold the pump in position and against rotation; it is indeed magnetic attraction that holds the pump to the basin.

Notably, a 1:1 paired relationship exists between the magnets of the motor and the magnets of the impeller: for each magnet fixed to the motor there is provided a magnet fixed to the impeller.

This arrangement has been well-received in the marketplace.

Reference is now made to FIGS. 5A-15, which show an improved spa 20 which represents an advance over that of FIGS. 1-4.

This spa 20 continues to include a basin 22, a motor 23 and a pump 24 which are all generally similar to the corresponding structures of the prior art but for the coupling 26,28, 41 between the impeller 27 and motor 23.

The inventive coupling comprises:

a. a drive hub 26 fixedly coupled to the motor 23 for rotation;

b. a drive hub in the form of a rotor body 28 which, in use, is disposed in spaced, frontwardly adjacent relation to the drive hub 26, is fixedly coupled to the rotatable element, i.e. the impeller 27 portion of the pump 24, and is at least substantially constrained against movement but for rotation, with the rotatable element, about the rotation axis X-X; and c. a flux ring 47

In the illustrated embodiment, the rotor body 28 constraint is provided by capturing the rotor body 28 in a chamber defined by an intake disc 37 from which a spindle 43 extends, a backer ring 39 and a bearing pan 41. The intake disc 37 is an injection molded plastic component which defines the jet outlets 45 of the pump and the water inlets 49. The backer ring 39 is secured to the intake disc 37 by sonic welding or the like, carries a plurality of sockets 55 for engagement with the basin pins 57, and defines an aperture 59. The bearing pan 41 is a shallow disc adapted for press-fit engagement in the aperture 59.

The spindle 43 is adapted to receive the rotor body 28 for rotation thereabout, and to support the rotor body 28 in spaced relation from the intake disc 37, to avoid friction.

The flux ring 47 is disposed in a socket in the backside of the backer ring 39 and is a material having a relatively high magnetically permeability, in this embodiment, carbon steel, this being arranged in spaced relation to the rotor body 28 in the assembled unit. Notably, magnetic attraction between the flux ring 47 and the drive hub 26 holds the assembled unit to the basin.

Figure 14:
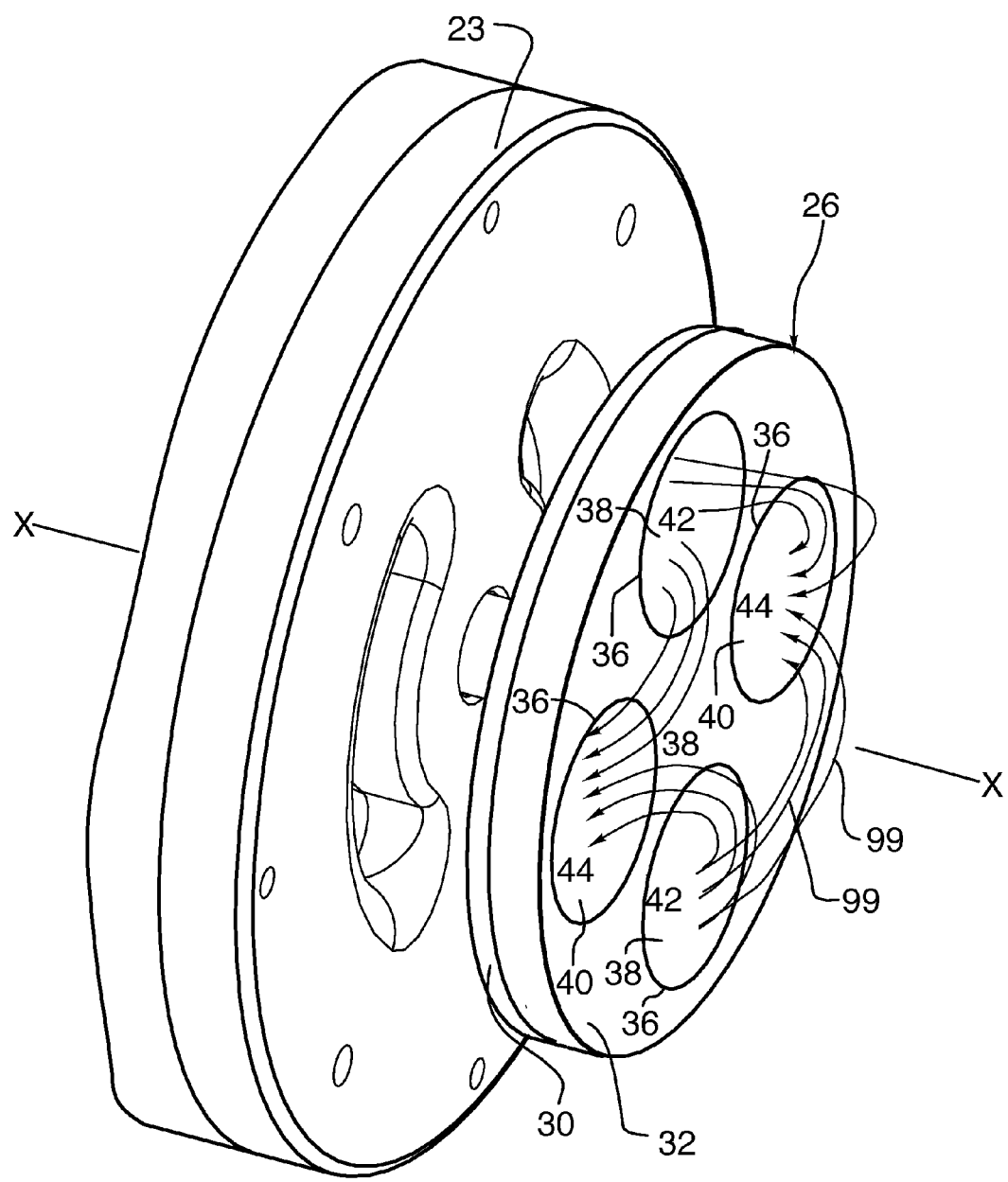
FIG. 14 is an enlarged view of the structure of encircled area 14 of FIG. 12.
Figure 15:
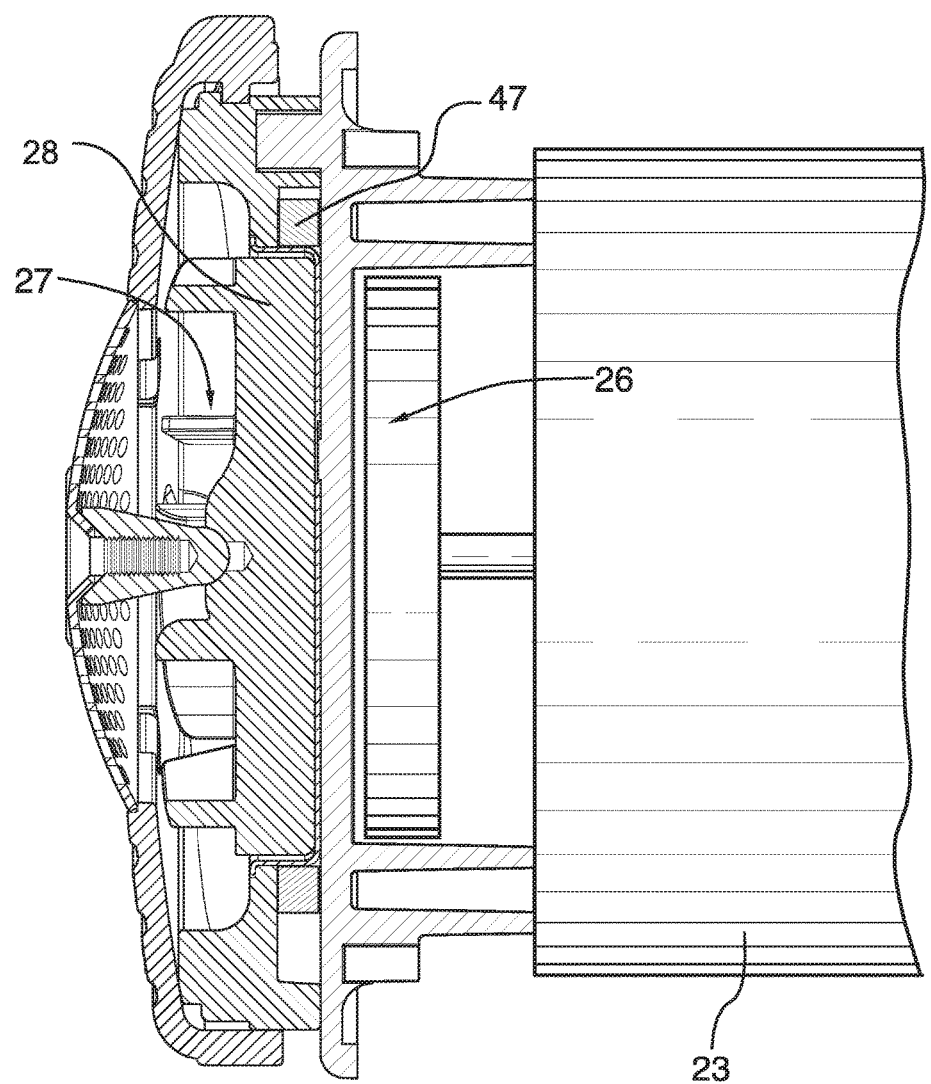
FIG. 15 is a sectional view of the structure of FIG. 6 in use.

The exemplary drive hub 26 is shown mounted to the motor 23 in FIG. 14 and will be seen to include a backer plate 30 and a drive body 32.

The backer plate 30 is made of a ferromagnetic material, namely, an iron alloy, so as to have high magnetic permeability, and is coupled to the drive shaft (not shown) of the motor 23.

The drive body 32 is a disc of aluminum alloy coupled to the side of the backer plate 30 opposite to that which is coupled to the drive shaft of the motor 23.

As seen in FIG. 14, defined within the drive body 32 are four sockets 36, spaced apart from each other and arranged to encircle the rotation axis X-X.

Mounted in each socket 36 is a disc-shaped permanent Neodyium magnet 38,38,40,40, the poles being arranged in alternating relation such that, in the front face of the drive hub, i.e. the face opposite the backer plate 30, there are defined two North pole domains 42 and two South pole domains 44.

The magnetic properties of this arrangement in the absence of externalities are depicted in idealized fashion in FIG. 14; herein, a magnetic field which extends from and returns to the hub 26 is shown, the magnetic field being characterized in that, field lines 99 extend from the two North pole domains 42 to the two South pole domains 44. The magnetic field lines 99 emanating from the backside of the driven hub 26 are not shown, for reasons of clarity, but will understood to be concentrated within the backer plate 30, by virtue of the ferromagnetic nature thereof.

Figure 8:
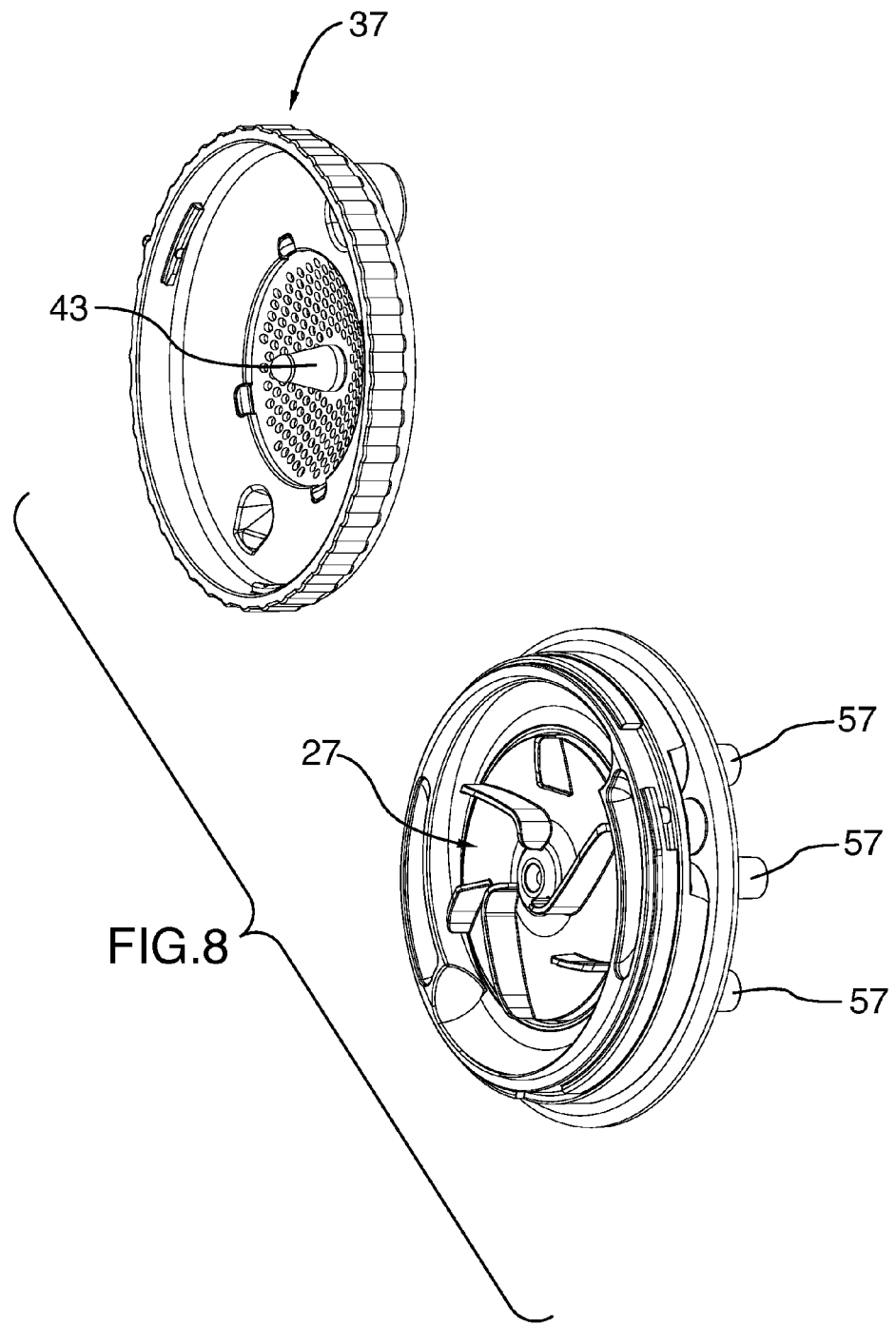
FIG. 8 is a partially exploded view of the structure of FIG. 6.
Figure 9:
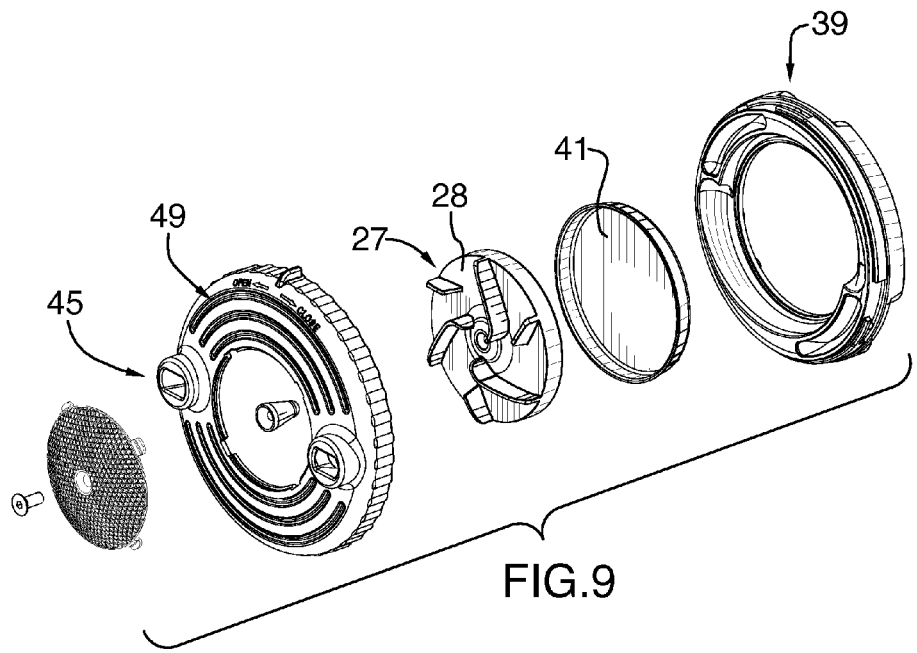
FIG. 9 is an exploded view of the structure of FIG. 6.
Figure 10:
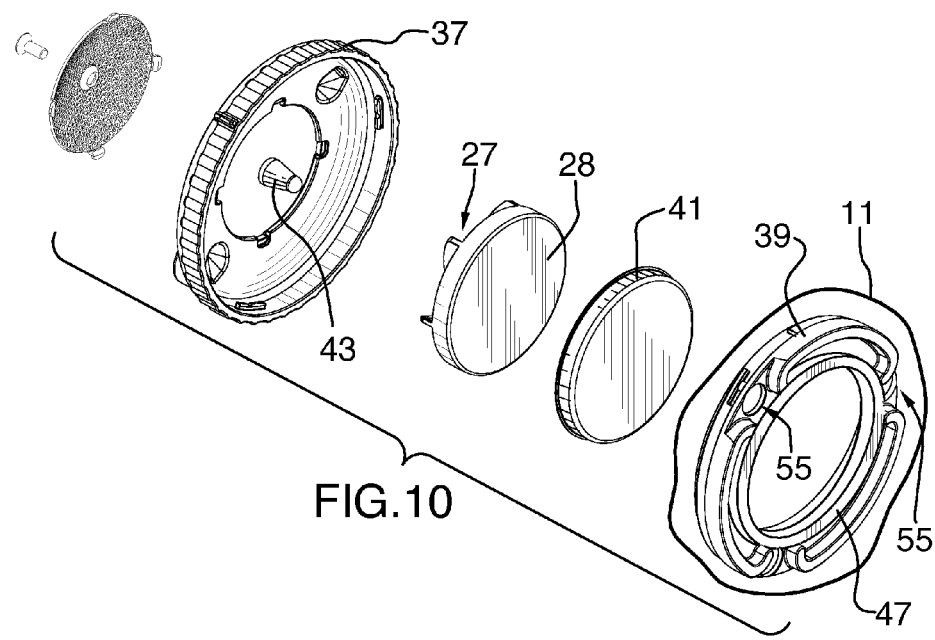
FIG. 10 is a view of the structure of FIG. 9 from another vantage point.
Figure 11:
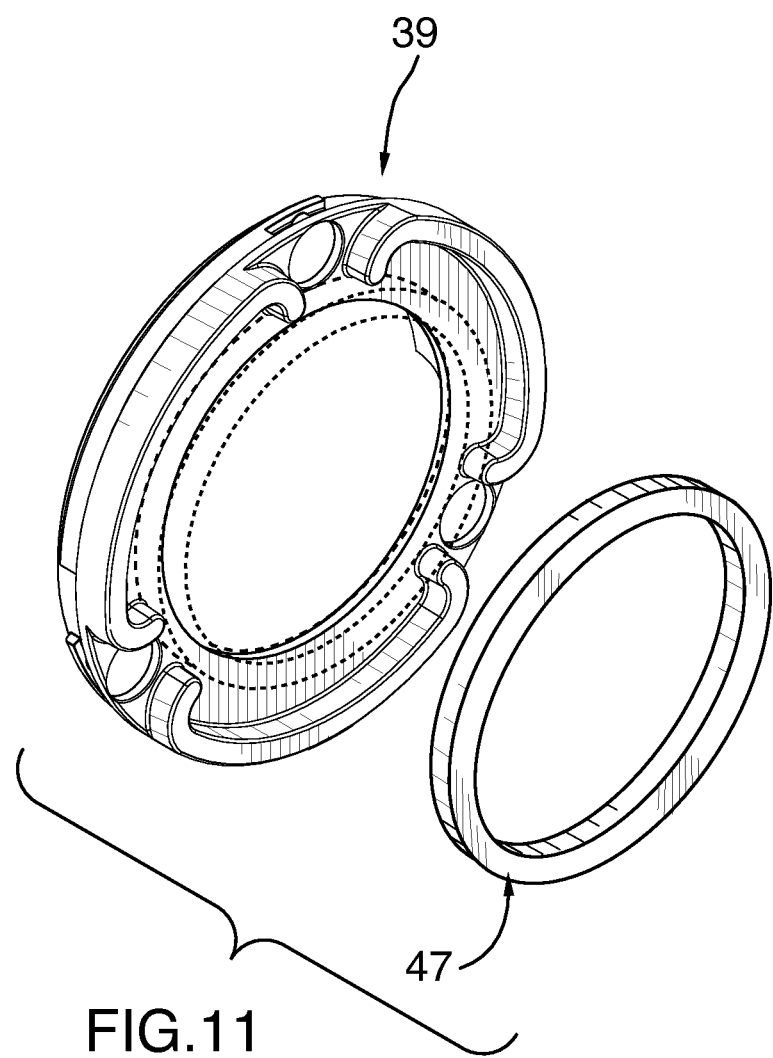
FIG. 11 is an exploded view of encircled structure 11 of FIG. 10.
Figure 12:
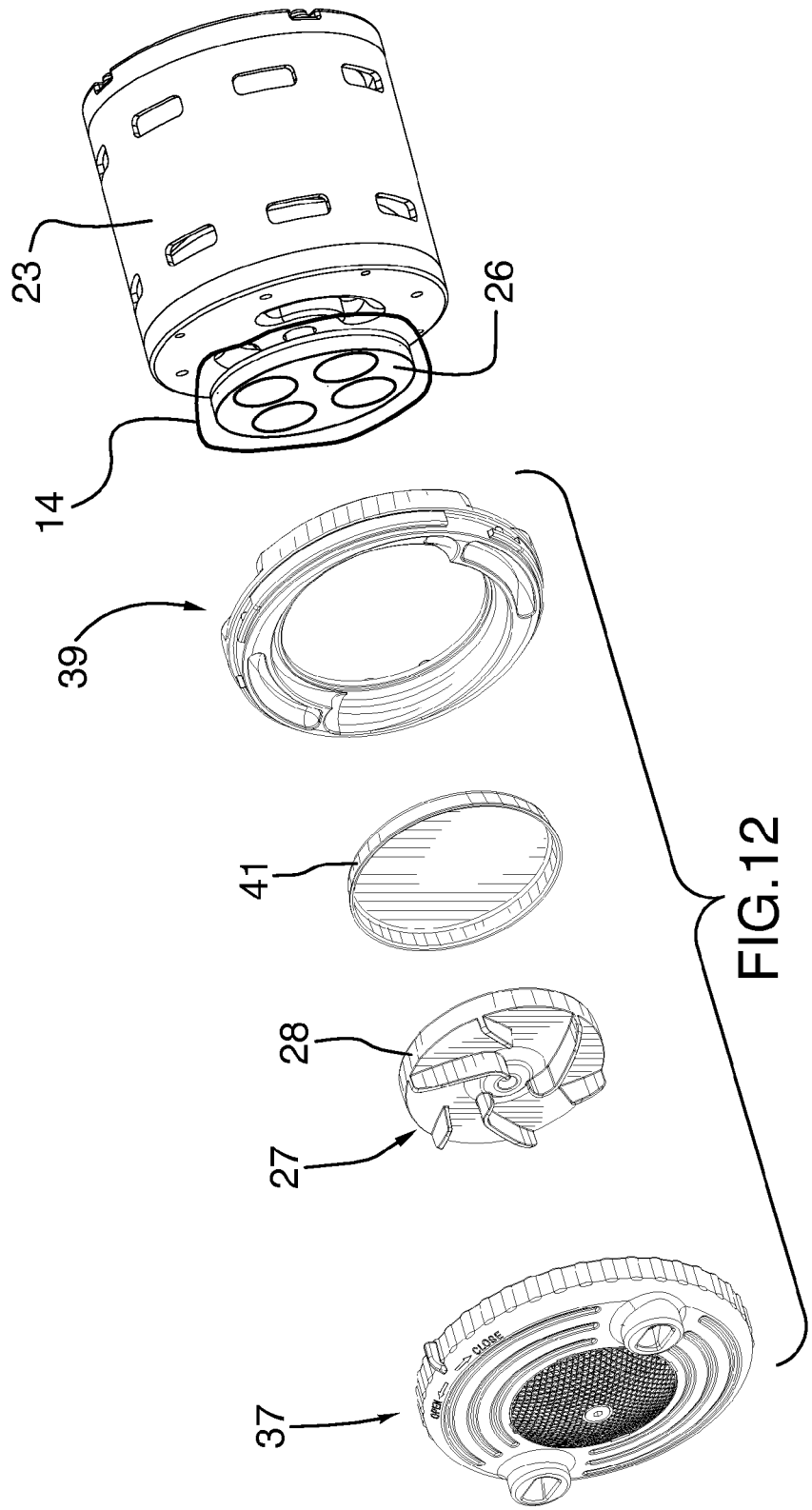
FIG. 12 is a view showing the structure of encircled area 12 of FIG. 5B aligned for use with the components of the structure of FIG. 6.
Figure 13:
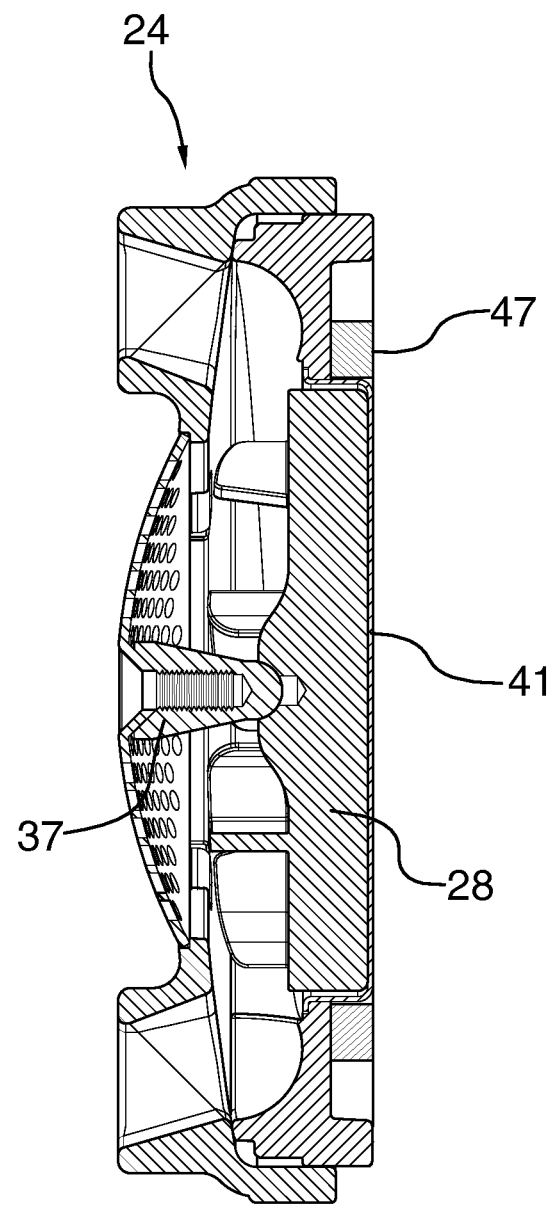
FIG. 13 is a sectional view of the structure of FIG. 6.

The driven hub is shown in exploded view in FIGS. 8-10 and will be seen to include a rotor body 28.

The rotor body 28 is a constructed out of a non-magnetic, electrically conductive material having relatively low magnetic permeability, specifically, an aluminum alloy.

This arrangement of the flux ring 47, rotor body 28 and drive hub 26 urges the rotor body 28 to rotate in the same direction as the drive hub 26. Without intending to be bound by theory, it is believed that (i) this arrangement provides for magnetic field lines that pass through the rotor body in a manner such that, in the aggregate, the through-passing field lines are dominated by field lines that extend through the rotor body in a direction that is substantially tangential to the direction of rotation axis, this phenomenon being well suited to produce a strong induced magnetic coupling.

An advantage of this arrangement is that, in contrast to the prior art coupling discussed hereinbefore, the coupling of the present invention can be removed and replaced without bringing the motor to rest. [In the prior art coupling, the inertia of the driven hub is too large to permit a dynamic magnet coupling at normal operating speeds: if the pump is, for example, dislodged in use, any attempt to replace the pump while the motor remains in motion will simply result in vibration of the impeller; no useful rotation will occur.

Yet further, motors used with the present coupling are less susceptible to burn-out than motors used with the prior art coupling. In the prior art, if the impeller is restrained against rotation, such as occurs if the pump becomes plugged, the motor is also restrained against rotation by the magnetic force; this is not the case with the present coupling.

Notable about this arrangement is that the permanent magnets reside only on the motor, therefore tending to reduce the cost associated with the pump assembly. This is also advantageous, as pumps are susceptible to damage and clogging and are therefore more frequently replaced than motors.

Whereas, but a single exemplary embodiment of the invention is herein described, variations are possible.

As well, whereas various specific materials, such as aluminum alloy, iron alloy and Neodyium are herein specified, it is understood that other materials, having similar magnetic properties, can be readily substituted therefor.

Without limitation, whereas the exemplary rotor body is described to be an aluminum alloy, i.e. a paramagnetic material, this is not believed to be essential, and other non-magnetic, electrically conductive materials can be substituted therefor.

As well, whereas the size and placement of the flux ring in the illustrated embodiment is known to be useful, this may not be critical.

Further, whereas the illustrated embodiment shows the use of iron alloys, i.e. ferromagnetic materials, in all components wherein relatively high magnetic permeability is required, ferromagnetic properties may not be necessary.

Accordingly, the invention should be understood as limited only by the accompanying claims, purposively construed.

The invention claimed is:

1. An apparatus for coupling a rotating element to a rotatable element, the rotating element rotating around a rotation axis, the apparatus comprising:
   a drive hub which, in use, is mounted to the rotating element for rotation therewith about the rotation axis, the hub having a front surface which presents away from the rotating element and having magnetic properties such that, in the absence of externalities, a magnetic field is produced which extends from and returns to the drive hub, the magnetic field being characterized in that, if depicted graphically, concentrations of field lines would appear to extend from two or more North pole domains defined in the front surface to two or more South pole domains defined in the front surface, the North and South pole domains being spaced apart from each other and arranged to encircle the rotation axis in alternating relation;
   a driven hub which, in use, is disposed in spaced, frontwardly adjacent relation to the drive hub, is fixedly coupled to the rotatable element and is at least substantially constrained against movement but for rotation, with the rotatable element, about the rotation axis, the driven hub including a rotor body of a non-magnetic, electrically-conductive material having relatively low magnetic permeability; and
   a flux ring of material having a relatively high magnetically permeability is arranged in spaced relation to the rotor body such that rotation of the drive hub relative to the driven hub creates a net rotational force on the driven hub that urges the driven hub to rotate in the same direction as the drive hub.

2. The apparatus according to claim 1, wherein, in use, magnetic field lines from the drive hub pass through the rotor body in a manner such that, in the aggregate, the through-passing field lines are dominated by field lines that extend through the rotor body in a direction that is substantially tangential to the direction of rotation.

3. The apparatus according to claim 1, wherein each of the North pole domains is defined by a respective permanent magnet and each of the South pole domains is defined by a respective permanent magnet.

4. The apparatus according to claim 3, wherein the number of North pole domains equals the number of South pole domains.

5. The apparatus according to claim 3, wherein, in use, the permanent magnets are equally spaced about the rotation axis.

6. The apparatus according to claim 3, wherein the drive hub has a backer plate defined by a material having relatively high magnetic permeability.

7. The apparatus according to claim 3, wherein the drive hub has a backer plate defined by a ferromagnetic material.

8. The apparatus according to claim 3, wherein the drive hub has a backer plate defined by an iron alloy.

9. The apparatus according to claim 3, wherein the permanent magnets are disc-shaped.

10. The apparatus according to claim 1, wherein the rotor body is a made of a paramagnetic material.

11. The apparatus according to claim 1, wherein the rotor body is made of an aluminum alloy.

12. The apparatus according to claim 1, wherein the receptors are made from a ferromagnetic material.

13. An improved spa comprising:
    a basin for containing water;
    a motor mounted exteriorly of the basin and having a rotating shaft; and
    a centrifugal pump mounted interiorly of the basin and including an impeller which, in use, is rotated by the motor for circulating water contained in the basin,
    wherein the improvement comprises
    the apparatus of claim 1 in use such that the rotating shaft defines the rotating element and the impeller defines the rotatable element.

14. The improved spa according to claim 13, wherein, in use, magnetic field lines of the apparatus pass from the drive hub pass through the rotor body in a manner such that, in the aggregate, the through-passing field lines are dominated by field lines that extend through the rotor body in a direction that is substantially tangential to the direction of rotation.

15. The improved spa according to claim 13, wherein each of the North pole domains of the apparatus is defined by a respective permanent magnet and each of the South pole domains is defined by a respective permanent magnet.

16. The improved spa according to claim 15, wherein the number of North pole domains equals the number of South pole domains.

17. The improved spa according to claim 13, wherein the rotor body of the apparatus is a made of a paramagnetic material.

18. The improved spa according to claim 13, wherein the rotor body of the apparatus is made of an aluminum alloy.

19. The improved spa according to claim 13, wherein the receptors of the apparatus are made from a ferromagnetic material.

* * * * *